United States Patent
Huang et al.

(10) Patent No.: US 10,137,601 B2
(45) Date of Patent: Nov. 27, 2018

(54) EXTRUDED EXPANDED THERMOPLASTIC POLYURETHANE ELASTOMER BEAD AND PREPARATION METHOD THEREFOR

(71) Applicant: Miracll Chemicals Co., Ltd., Yantai, Shandong (CN)

(72) Inventors: Bo Huang, Yantai (CN); Renhong Wang, Yantai (CN); Guangfu Wang, Yantai (CN); Sheng Zhang, Yantai (CN); Wei Zhao, Yantai (CN)

(73) Assignee: Miracll Chemicals Co., Ltd., Yantai, Shandong (CN)

( * ) Notice: Subject to any disclaimer, the term of this patent is extended or adjusted under 35 U.S.C. 154(b) by 29 days.

(21) Appl. No.: 15/120,084

(22) PCT Filed: Jul. 21, 2014

(86) PCT No.: PCT/CN2014/082601
§ 371 (c)(1),
(2) Date: Aug. 18, 2016

(87) PCT Pub. No.: WO2015/123961
PCT Pub. Date: Aug. 27, 2015

(65) Prior Publication Data
US 2017/0246765 A1  Aug. 31, 2017

(30) Foreign Application Priority Data

Feb. 18, 2014  (CN) .......................... 2014 1 0055218

(51) Int. Cl.
*B29C 44/44* (2006.01)
*B29B 9/06* (2006.01)
(Continued)

(52) U.S. Cl.
CPC ................ *B29B 9/065* (2013.01); *B29B 7/72* (2013.01); *B29B 9/12* (2013.01); *B29C 44/3461* (2013.01); *B29C 47/0011* (2013.01); *B29C 47/92* (2013.01); *C08G 18/14* (2013.01); *C08G 18/3206* (2013.01); *C08G 18/341* (2013.01); *C08G 18/4854* (2013.01); *C08G 18/6692* (2013.01); *C08G 18/7671* (2013.01); *C08J 9/0014* (2013.01); *C08J 9/0023* (2013.01); *C08J 9/0028* (2013.01); *C08J 9/0038* (2013.01); *C08J 9/0066* (2013.01); *C08J 9/0095* (2013.01); *C08J 9/141* (2013.01); *C08J 9/16* (2013.01); *C08K 3/26* (2013.01); *C08K 3/346* (2013.01); *C08K 3/36* (2013.01); *C08K 3/38* (2013.01); *C08K 5/134* (2013.01); *C08L 75/04* (2013.01); *B29B 7/46* (2013.01); *B29B 7/7461* (2013.01); *B29C 2947/926* (2013.01); *B29C 2947/92514* (2013.01); *B29C 2947/92685* (2013.01); *B29C 2947/92704* (2013.01); *B29C 2947/92885* (2013.01); *B29C 2947/92895* (2013.01); *B29C 2947/92923* (2013.01); *B29C 2947/92971* (2013.01); *B29K 2075/00* (2013.01); *C08G 2101/0058* (2013.01);
(Continued)

(58) Field of Classification Search
CPC ... B29C 44/3461; C08J 9/0061; C08J 9/0066; C08J 9/16; C08J 9/232; C08J 2201/024; C08J 2201/03; C08J 2203/182
See application file for complete search history.

(56) References Cited

U.S. PATENT DOCUMENTS 5,108,673 A * 4/1992 Wegmann ................. B29B 9/06
  264/143
2002/0040978 A1  4/2002 Narayan et al.
(Continued)

FOREIGN PATENT DOCUMENTS

CN  101618593 A  1/2010
CN  101735507 A  6/2010
(Continued)

OTHER PUBLICATIONS

Wang et al, Effects of additives on weather-resistance properties of Polyurethane films exposed to ultraviolet radiation and ozone atmosphere, J. of Nanomater., vol. 2014, Article ID 487343, 7 pages (Jan. 2014).*

(Continued)

*Primary Examiner* — Hoa (Holly) Le
(74) *Attorney, Agent, or Firm* — Greenberg Traurig, LLP

(57) ABSTRACT

The present invention relates to an extruded expanded thermoplastic polyurethane elastomer bead and a preparation method therefor. The bead consists of components of the following parts by weight: 100 parts by weight of a thermoplastic polyurethane elastomer, 0.01-0.5 parts of a foaming nucleating agent, and 0.01-0.2 parts by weight of an antioxidant. The preparation method comprises: mixing materials, then putting the mixture into an extruder for granulation to produce a particle raw material suitable for foaming, finally, putting the particle into a foam extruder, and die foaming then underwater pelletizing, thus obtaining a product bead. The present invention utilizes an extrusion method to prepare expanded thermoplastic polyurethane beads. Control of the working conditions of the foaming process could lead to acquiring an expanded=bead of a controllable density, the cell density evenly distribute. The overall production process is easy to operate. Without any special limit or requirement placed on the equipment, this method is suitable for industrial continuous production.

9 Claims, No Drawings

(51) Int. Cl.
| | |
|---|---|
| B29C 44/34 | (2006.01) |
| B29C 47/92 | (2006.01) |
| B29B 7/72 | (2006.01) |
| B29B 9/12 | (2006.01) |
| B29C 47/00 | (2006.01) |
| C08J 9/16 | (2006.01) |
| C08L 75/04 | (2006.01) |
| C08J 9/00 | (2006.01) |
| C08J 9/14 | (2006.01) |
| C08G 18/08 | (2006.01) |
| C08G 18/32 | (2006.01) |
| C08G 18/34 | (2006.01) |
| C08G 18/48 | (2006.01) |
| C08G 18/66 | (2006.01) |
| C08G 18/76 | (2006.01) |
| C08K 3/26 | (2006.01) |
| C08K 3/34 | (2006.01) |
| C08K 3/36 | (2006.01) |
| C08K 3/38 | (2006.01) |
| C08K 5/134 | (2006.01) |
| B29B 7/46 | (2006.01) |
| B29B 7/74 | (2006.01) |
| B29K 75/00 | (2006.01) |
| C08G 101/00 | (2006.01) |

(52) U.S. Cl.
CPC ... *C08G 2101/0066* (2013.01); *C08J 2201/03* (2013.01); *C08J 2203/14* (2013.01); *C08J 2300/22* (2013.01); *C08J 2300/26* (2013.01); *C08J 2375/04* (2013.01); *C08K 2003/265* (2013.01); *C08K 2003/387* (2013.01)

(56) References Cited

U.S. PATENT DOCUMENTS

| | | | |
|---|---|---|---|
| 2010/0130627 A1* | 5/2010 | Casalini | B29C 44/3461 521/59 |
| 2011/0193256 A1 | 8/2011 | Henze et al. | |
| 2012/0329892 A1 | 12/2012 | Prissok et al. | |
| 2015/0174808 A1* | 6/2015 | Rudolph | C08G 18/6674 264/12 |

FOREIGN PATENT DOCUMENTS

| | | | |
|---|---|---|---|
| CN | 102040785 A | | 5/2011 |
| CN | 1025558830 A | * | 7/2012 |
| CN | 103183955 A | | 7/2013 |
| CN | 103408922 A | | 11/2013 |
| CN | 103804890 A | | 5/2014 |
| EP | 3109281 A1 | | 12/2016 |
| WO | 2013/153190 A1 | | 10/2013 |

OTHER PUBLICATIONS

Translation CN 102558830A (2012) (Year: 2012).*
Extended European Search Report dated Sep. 15, 2017, issued by the European Patent Office in European Patent Application No. 14883376.7 (6 pages).

* cited by examiner

US 10,137,601 B2

EXTRUDED EXPANDED THERMOPLASTIC POLYURETHANE ELASTOMER BEAD AND PREPARATION METHOD THEREFOR

FIELD OF THE INVENTION

The present invention relates to an extruded expanded thermoplastic polyurethane elastomer bead and a preparation method thereof, belonging to the field of expanded plastic materials

DESCRIPTION OF RELATED ART

The expanded polymer material is prepared by filling plenty of bubbles into the matrix of plastics using physical or chemical methods. The expanded plastic material has the advantages of low density, good thermal and sound insulation, high specific tensile strength, and energy absorption, etc, thereby being widely used in packaging industry, manufacturing industry, agriculture, transportation, military industry, aerospace industry, daily necessities, and the like. Common types of expanded plastics include soft and hard foamed polyurethane (PU) plastics, expanded polystyrene (PS) plastics, expanded polyethylene (PE) plastics, expanded polypropylene (PP) plastics, and so on. However, in the foaming process of the foamed polyurethane plastics, harmful residues of isocyanate are usually found. Another disadvantage of the expanded polyurethane material is the lack of recyclability. Expanded polystyrene plastic products are difficult to degrade, resulting in the "white pollution-"problems more likely. The United Nations Environment Organization has decided to suspend the use of the expanded PS plastic products. The expanded polyethylene plastics have a poor heat-resistant performance, thus being not suitable for applications in high-temperature environments.

The thermoplastic polyurethane elastomer (TPU) has the advantages of wide rigidity range, excellent abrasion resistance and mechanical strength, water, oil, chemical corrosion, and mold resistance, and recyclability, etc. Other than preserving the excellent performance of the original matrix, the foam material prepared with TPU also has excellent resilience, and being applicable in a wider range of temperature. Based on the above advantages, the expanded TPU material is predicted to have a very wide range of applications in many industries (automotive industry and packaging materials) and daily life fields (shoe materials and floor coatings).

The current dominating method for preparing expanded thermoplastic polyurethane beads is batch foaming process. WO2007/082838 has disclosed a process for preparing expanded thermoplastic polyurethane. In an autoclave, for this process, TPU particles are uniformly dispersed with dispersing agent, surfactant, and n-butane foaming agent in water. After heating the mixture to a specified temperature for a certain period of time, the mixture are decompressed rapidly to the atmospheric pressure to obtain the expanded thermoplastic polyurethane beads, which then undergo processes of washing and drying, to obtain the raw material for steam-chest molding products. This batch foaming process is very complex and costly.

SUMMARY OF THE INVENTION

The technical problem solved by the present invention is to provide an extruded expanded thermoplastic polyurethane elastomer bead and the preparation method thereof. The method makes it possible for continuous production and provides foam materials with a stable quality.

The technical solution of the present invention for solving the above-mentioned technical problems is as follows: an extruded expanded thermoplastic polyurethane elastomer bead, consisting essentially of the following components in parts by weight: 100 parts by weight of a thermoplastic polyurethane elastomer (TPU), 0.01-0.5 parts by weight of a foaming nucleating agent, and 0.01-0.2 parts by weight of an antioxidant.

On the basis of the above-mentioned technical solution, the following improvements can also be brought upon by the present invention.

Further, the Shore hardness of the thermoplastic polyurethane elastomer (TPU) is 55A-95A.

Hardness is a physical measurement of compressive deformation degree or puncture resistant ability of a material. There are two types of hardness, relative hardness and absolute hardness. The absolute hardness is usually used in scientific study, but rarely used in the practice of industrial production. The hardness system normally used in the field of foam materials is the relative hardness, usually identified with the following methods: Shore, Rockwell, and Brinell. The Shore hardness is generally used for rubber materials to measure the ability of the surface of plastics or rubbers to resist indentation by hard objects. The conversion relationship between the Shore hardness (HS) and the Brinell hardness (BHN) is HS=BHN/10+12. The test method of the Shore hardness is as follows: a Shore hardness meter is inserted into a tested material, with a pointer on a meter dial connected to a puncture needle through a spring; the needle punctures into the surface of the measured object; and the displayed value on the meter dial is the hardness value.

Further, the melt flow rate (MI) of the thermoplastic polyurethane elastomer (TPU) is 5-50 g/10 min.

The above value is measured by applying a weight of 5 kg at 180° C. according to ASTM-1238. ASTM stands for the American Society for Testing and Materials, formerly known as the International Association for Testing Materials (IATM). In the 1880s, in order to solve the disputes and various opinions of purchasers and suppliers in the transaction of industrial materials, a technical committee was proposed to be established, responsible for organizing technical symposiums and having representatives of all involved parties to participate and discuss on how to resolve the contentious issues in material specifications and test procedures. The missions of the ASTM are to promote public health and safety, improve the quality of life, provide reliable raw materials, products, systems, and services, and to promote the national, regional, and further the international economy. The ASTM-1238 is a standard of the ASTM for testing the melt flow rate of plastics.

Further, the thermoplastic polyurethane elastomer (TPU) is based on a polytetrahydrofuran having a number-average molecular weight of 500-200 g/mol, or a polyester polyol having a number-average molecular weight of 800-1200 g/mol, or a mixture of the two thereof.

Definition of number-average molecular weight: polymer material is composed of homologous mixtures having the same chemical composition but different degrees of polymerization, i.e., being composed of a mixture of polymer molecules with different chain lengths. The size of molecules is usually characterized by the—number-average molecular weight. The statistical average calculated per the number of molecules is referred to as a number-average molecular weight, with the symbol ($M_N$).

Polytetrahydrofuran is a white waxy solid, highly soluble in alcohols, esters, ketones, aromatic hydrocarbons, and chlorinated hydrocarbons, but insoluble in aliphatic hydrocarbons and water. When the temperature exceeds the room temperature, polytetrahydrofuran becomes a transparent liquid.

Polyester polyol, an organic compound, is usually synthesized by the condensation (or transesterification) of an organic dicarboxylic acid (anhydride or ester) and a polyol (including a glycol) or by the polymerization of a lactone and a polyol. The dicarboxylic acid can be phthalic acid or phthalic acid anhydride or esters thereof, adipic acid, halogenated phthalic acid, etc. The polyol could be ethylene glycol, propylene glycol, diethylene glycol, trimethylol propane, pentaerythritol, etc. Various polyester polyols, due to different types or different preparation processes, have different properties. Some important parameters for polyester polyols are hydroxyl value, acid value, moisture content, viscosity, molecular weight, density, and chroma, etc. Properties and applications of polyester polyols are as follows: polyester polyurethanes contain many polar groups such as ester groups and amino groups in molecules thereof, and thus have high cohesive strength, high adhesive strength, high mechanical strength and good abrasion resistance.

Further, the foaming nucleating agent is selected from the group consisting of talc, silicon dioxide, calcium carbonate, zeolite, graphite powder, alumina, calcium hydroxide, aluminum hydroxide, and zinc borate, or a mixture thereof.

In addition, the antioxidant is selected from the group consisting of Antioxidant 1010, Antioxidant 245, Antioxidant 168, and Antioxidant Chinox 20N, or a mixture thereof.

Antioxidant 1010 is a white crystal powder with a stable chemical property, and can be widely used in industries of general plastics, engineering plastics, synthetic rubbers, fibers, hot melt adhesives, resins, oils, inks, and paints. Antioxidant 245, named glycol bis[beta-(3-tert-butyl-4-hydroxy-5-methylphenyl)propionate], is used as an antioxidant for the processing and improvement of long-term thermal stability of styrene polymers such as HIPS, MBS, and ABS, engineering plastics such as POM and PA, and polyurethanes such as spandex. It is also an effective chain terminator for PVC polymerization process. This product has no effect on the polymerization reaction, and could be added into monomers before polymerization when being used for high impact resistant polystyrene and polyvinyl chloride. Antioxidant 168 is named tris[2,4-di-tert-butylphenyl]phosphite. This product works as a secondary antioxidant and when formulated with a primary antioxidant zm-1010 or 1076, has a good synergistic effect. This product can effectively prevent the thermal decomposition of polypropylene and polyethylene in basic injection molding, thereby providing an additional long-lasting protection for the polymers. Antioxidant Chinox 20N is a conventional antioxidant in the field, having excellent heat and oxidation resistance, no color staining, and excellent hydrolysis resistance; it works well with TPU, and may also be used for POM and PPR pipe materials.

Another technical solution that the present invention provides to solve the above technical problem is as follows: a preparation method for extruded expanded thermoplastic polyurethane elastomer beads, comprising the following steps: uniformly mixing 100 parts by weight of a thermoplastic polyurethane elastomer, 0.01-0.5 parts by weight of a foaming nucleating agent, and 0.01-0.2 parts by weight of an antioxidant, granulating the mixture using an extruder to produce the raw material for foaming, and finally putting the raw material into a foam extruder and a volatile foaming agent into the extruder. With the head pressure of the extruder ranging from 1 to 30 MPa, the melt is formed through the die, and pelletized underwater, so that the extruded foamed thermoplastic polyurethane elastomer beads are obtained.

Further, the volatile foaming agent is selected from the group consisting of propane, n-butane, isobutane, n-pentane, and isopentane, or a mixture thereof, and the amount of the volatile foaming agent added is 1-40 parts by weight.

Additionally, the foam extruder is one of the following: a single-stage, single-screw extruder, a serial two-stage, single-screw extruder, and a co-rotating twin screw extruder.

The die head pressure of the foam extruder is 1 MPa-30 MPa; the die temperature is 150-185° C. and the water temperature of an underwater pelletizing machine is 40-80° C.

The foaming density of the extruded expanded thermoplastic polyurethane bead is 0.05-0.5 g/cm$^3$.

Performance Test of the Present Invention

A foaming density $\rho_f$ of the expanded bead is measured according to the standard ASTM D792-2008 of ASTM.

The calculation formula of the foaming density is:

$$\rho_f = W1/(W1+W2-W3).$$

where W1 is the mass of the expanded beads in the air; W2 is the weight of the metal cap to keep the expanded beads immersed in the water; and W3 is the mass of the expanded beads in the water.

The beneficial effects of the present invention are described as below: the present invention utilizes an extrusion method for preparing expanded thermoplastic polyurethane beads; the density of the expanded beads produced is under control due to the controlled working conditions of the foaming process; the cell density of the produced beads is evenly distributed; the entire production process, is simple in operation without any specific limitations on and requirements for the equipment, and is suitable for industrial continuous production.

DETAILED DESCRIPTION OF THE INVENTION

Description of the principles and features of the present invention are given in what follows. The listed examples are only used for the explanation of the present invention, but not intended to limit the scope of the present invention.

The present invention is described in detail with specific examples.

The components used in the thermoplastic polyurethane elastomer (TPU) are shown in Table 1:

TABLE 1

| | Soft segment | | | | TPU | | | |
|---|---|---|---|---|---|---|---|---|
| | Composition (mol) | | | Molar | Composition (mol) | | | |
| TPU | Adipic acid | 1,4-butylene glycol | Polytetrahydrofuran | mass (g/mol) | Soft segment | 1,4-butylene glycol | 4,4-MDI | Shore hardness |
| A | 1 | 1 | — | 900 | 1.00 | 0.55 | 1.55 | 80A |
| B | — | — | 1 | 1500 | 1.00 | 0.83 | 1.83 | 85A |

The Shore hardness of TPU is tested according to the ASTM D2204-05 standard.

EXAMPLE 1

100 parts of a thermoplastic polyurethane (TPU) particle A (shown in Table 1), 0.2 parts by weight of talc, and 0.05 parts by weight of Antioxidant 1010 were uniformly mixed; the mixture was then put into an extruder for granulation to obtain the granular raw material for foaming; and finally the raw material was put into a single-stage, single-screw extruder. The extrusion rate of the materials was controlled at 55 kg per hour. The rate of injecting n-butane into the extruder was controlled at 5 kg per hour. The die head pressure was 13 Mpa; the die head temperature was 172° C., and the water temperature of the underwater pelletizing machine was controlled at 70° C. The materials were added continuously according to the above composition ratio for a continuous production, so as to obtain beads with a foaming density of 0.215 g/cm³.

EXAMPLE 2

100 parts of a thermoplastic polyurethane (TPU) particle A (shown in Table 1), 0.3 parts by weight of silicon dioxide, and 0.07 parts by weight of Antioxidant 245 were uniformly mixed; the mixture was then put into an extruder for granulation to obtain the granular raw material for foaming; and finally the raw material was put into a single-stage, single-screw extruder. The extrusion rate of the materials was controlled at 55 kg per hour. The rate of injecting propane into the extruder was controlled at 7 kg per hour. The die head pressure was 15 Mpa; the die head temperature was 168° C., and the water temperature of the underwater pelletizing machine was controlled at 55° C. The materials were added continuously according to the above composition ratio for a continuous production, so as to obtain beads with a foaming density of 0.202 g/cm³.

EXAMPLE 3

100 parts of a thermoplastic polyurethane (TPU) particle B (shown in Table 1), 0.1 parts by weight of calcium carbonate, and 0.1 parts by weight of Antioxidant 1010 were uniformly mixed; the mixture was then put into an extruder for granulation to obtain the granular raw material for foaming; and finally the raw material was put into a co-rotating twin screw extruder. The extrusion rate of the materials was controlled at 40 kg per hour. The rate of injecting n-pentane into the extruder was controlled at 7 kg per hour. The die head pressure was 16 Mpa: the die head temperature was 183° C., and the water temperature of the underwater pelletizing machine was controlled at 70° C. The materials were added continuously according to the above composition ratio for a continuous production, so as to obtain beads with a foaming density of 0.152 g/cm³.

EXAMPLE 4

100 parts of a thermoplastic polyurethane (TPU) particle B (shown in Table 1), 0.08 parts by weight of zinc borate, 0.1 parts by weight of Antioxidant 1010, and 0.05 parts by weight of Antioxidant Chinox 20N were uniformly mixed; the mixture was then put into an extruder for granulation to obtain the granular raw material for foaming; and finally the raw material was put into a co-rotating twin screw extruder. The extrusion rate of the materials was controlled at 40 kg per hour. The rate of injecting a mixed gas of n-pentane and isopentane into the extruder was controlled at 8 kg per hour. The die head pressure was 18 Mpa; the die head temperature was 175° C., and the water temperature of the underwater pelletizing machine was controlled at 65° C. The materials were added continuously according to the above composition ratio for a continuous production, so as to obtain beads with a foaming density of 0.132 g/cm³.

EXAMPLE 5

100 parts of a thermoplastic polyurethane (TPU) particle B (shown in Table 1), 0.08 parts by weight of zinc borate, 0.1 parts by weight of Antioxidant 1010, and 0.05 parts by weight of Antioxidant Chinox 20N were uniformly mixed; the mixture was then put into an extruder for granulation to obtain the granular raw material for foaming; and finally the raw material was put into a co-rotating twin screw extruder. The extrusion rate of the materials was controlled at 40 kg per hour. The rate of injecting a mixed gas of n-butane and isobutane into the extruder was controlled at 10 kg per hour. The die head pressure was 20 Mpa; the die head temperature was 180° C., and the water temperature of the underwater pelletizing machine was controlled at 65° C. The materials were added continuously according to the above composition ratio for a continuous production, so as to obtain beads with a foaming density of 0.112 g/cm³.

COMPARATIVE EXAMPLE

Preparation of Thermoplastic Polyurethane Expanded Beads Without the Addition of Foaming Nucleating Agents 100 parts of a thermoplastic polyurethane (TPU) particle B (shown in Table 1), 0.1 parts by weight of Antioxidant 1010, and 0.05 parts by weight of Antioxidant Chinox 20N were uniformly mixed; the mixture was then put into an extruder for granulation to obtain the granular raw material for foaming; and finally the raw material was put into a co-rotating twin screw extruder. The extrusion rate of the materials was controlled at 40 kg per hour. The rate of injecting n-butane into the extruder was controlled at 8 kg per hour. The die head pressure was 19 Mpa; the die head temperature was 175° C., and the water temperature of the underwater pelletizing machine was controlled at 65° C. The materials were added continuously according to the above composition ratio for a continuous production, so as to obtain beads with a foaming density of 0.128 g/cm³.

The proportion of each raw material component added, the die head temperature and the die head pressure during the preparation of the expanded beads, and the foaming density of the bead are summarized in Table 2 below:

TABLE 2

|  | Examples | | | | | Comparative Example |
|---|---|---|---|---|---|---|
|  | 1 | 2 | 3 | 4 | 5 |  |
| TPU | 100 | 100 | 100 | 100 | 100 | 100 |
| Nucleating agent | 0.2 | 0.3 | 0.1 | 0.08 | 0.08 | — |
| Antioxidant | 0.05 | 0.07 | 0.1 | 0.15 | 0.15 | 0.15 |
| Foaming agent | 9 | 13 | 17 | 20 | 25 | 20 |

TABLE 2-continued

| | Examples | | | | | Comparative Example |
|---|---|---|---|---|---|---|
| | 1 | 2 | 3 | 4 | 5 | |
| Die head temperature (° C.) | 172 | 168 | 183 | 175 | 180 | 175 |
| Die head pressure (MPa) | 13 | 15 | 16 | 18 | 20 | 19 |
| Bead density (g/cm$^3$) | 0.215 | 0.202 | 0.152 | 0.132 | 0.112 | 0.128 |

The nucleating agent, the antioxidant, and the foaming agent in the above table are given in weight percent (based on parts by weight of the TPU particle).

In Examples 1-5, the density of the resulting expanded beads is between 0.112-0.215 g/cm$^3$, and the beads have a bright and smooth surface, meeting the requirement of the present invention. In contrast, the thermoplastic polyurethane beads produced from the Comparative example without any foaming nucleating agent has a density of 0.128 g/cm$^3$. The cell density in the particle is not uniform. Large and small cell exist apparently.

The examples above were merely preferred embodiments of the present invention, and they are not intended to limit the extent of the present invention. Any modification, equivalent substitution, and improvement made within the spirit and principle of the present invention shall fall into the extent of protection of the claims of the present invention.

What is claimed is:

1. An extruded expanded thermoplastic polyurethane elastomer bead, consisting essentially of the following components in parts by weight: 100 parts by weight of a thermoplastic polyurethane elastomer, 0.01-0.5 parts by weight of a foaming nucleating agent, and 0.01-0.2 parts by weight of an antioxidant wherein a Shore hardness of the thermoplastic polyurethane elastomer is 55A -95A.

2. The extruded expanded thermoplastic polyurethane elastomer bead of claim 1, wherein a melt flow rate of the thermoplastic polyurethane elastomer is 5-50 g/10 min.

3. The extruded expanded thermoplastic polyurethane elastomer bead of claim 1, wherein the thermoplastic polyurethane elastomer is based on a polytetrahydrofuran having a number-average molecular weight of 500-2000 g/mol, or a polyester polyol having a number-average molecular weight of 800-1200 g/mol, or a mixture thereof.

4. The extruded expanded thermoplastic polyurethane elastomer bead of claim 3, wherein the foaming nucleating agent is selected from the group consisting of talc, silicon dioxide, calcium carbonate, zeolite, graphite powder, alumina, calcium hydroxide, aluminum hydroxide, and zinc borate, or a mixture thereof.

5. The extruded expanded thermoplastic polyurethane elastomer bead of claim 3, wherein the antioxidant is selected from the group consisting of Antioxidant 1010, Antioxidant 245, Antioxidant 168, and Antioxidant Chinox 20N, or a mixture thereof.

6. A process for preparing an extruded expanded thermoplastic polyurethane elastomer bead, comprising the following steps: mixing 100 parts by weight of a thermoplastic polyurethane elastomer, 0.01-0.5 parts by weight of a foaming nucleating agent, and 0.01-0.2 parts by weight of an antioxidant uniformly, granulating the mixture in an extruder to produce a raw material suitable for foaming, and finally feeding the raw material into a foam extruder, injecting a volatile foaming agent into the foam extruder, extruding the resulted melt through a die for foaming, and pelletizing the melt underwater, to prepare the extruded expanded thermoplastic polyurethane elastomer bead.

7. The extruded expanded thermoplastic polyurethane elastomer bead made by the process of claim 6, wherein the volatile foaming agent is selected from the group consisting of propane, n-butane, isobutane, n-pentane, and isopentane, or a mixture thereof, and the amount of the volatile foaming agent added is 1-40 parts by weight.

8. The extruded expanded thermoplastic polyurethane elastomer bead made by the process of claim 6, wherein the foaming-dedicated extruder is one of the following types: a single-stage, single-screw extruder; a serial two-stage, single-screw extruder; or a co-rotating twin screw extruder.

9. The extruded expanded thermoplastic polyurethane elastomer bead of claim 8, wherein a die head pressure of the foam extruder is 1-30 MPa, a die head temperature is 150-185° C. and a water temperature of an underwater pelletizing machine is 40-80° C.

* * * * *